United States Patent
Alexander, III et al.

(10) Patent No.: US 7,386,690 B2
(45) Date of Patent: Jun. 10, 2008

(54) METHOD AND APPARATUS FOR HARDWARE AWARENESS OF DATA TYPES

(75) Inventors: William Preston Alexander, III, Austin, TX (US); Robert Tod Dimpsey, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 10/835,106

(22) Filed: Apr. 29, 2004

(65) Prior Publication Data

US 2005/0246696 A1 Nov. 3, 2005

(51) Int. Cl.
*G06F 12/00* (2006.01)
(52) U.S. Cl. .................................................... 711/156
(58) Field of Classification Search .................. 711/156
See application file for complete search history.

(56) References Cited

U.S. PATENT DOCUMENTS

| | | | |
|---|---|---|---|
| 5,444,846 A * | 8/1995 | Nagashima ................. | 345/504 |
| 5,555,432 A | 9/1996 | Hinton et al. | |
| 5,590,352 A | 12/1996 | Zuraski et al. | |
| 5,761,103 A | 6/1998 | Oakland et al. | |
| 5,875,294 A | 2/1999 | Roth et al. | |
| 6,073,109 A | 6/2000 | Flores et al. | |
| 6,105,129 A | 8/2000 | Meier et al. | |
| 6,145,077 A | 11/2000 | Sidwell et al. | |
| 6,149,318 A * | 11/2000 | Chase et al. ................. | 717/131 |
| 6,185,671 B1 * | 2/2001 | Pentovski et al. .......... | 712/216 |
| 6,199,204 B1 | 3/2001 | Donohue | |
| 6,202,207 B1 | 3/2001 | Donohue | |
| 6,247,113 B1 * | 6/2001 | Jaggar ........................ | 712/200 |
| 6,460,135 B1 * | 10/2002 | Suganuma ................... | 712/221 |
| 6,598,153 B1 | 7/2003 | Flachs et al. | |
| 6,842,850 B2 * | 1/2005 | Ganapathy et al. ......... | 712/221 |
| 6,865,666 B2 | 3/2005 | Yoshida et al. | |
| 6,871,298 B1 | 3/2005 | Cavanaugh et al. | |
| 6,928,521 B1 | 8/2005 | Burton et al. | |
| 2003/0041096 A1 | 2/2003 | Johnson | |
| 2003/0126590 A1 * | 7/2003 | Burrows et al. ............ | 717/154 |
| 2004/0120338 A1 * | 6/2004 | Cheung et al. ............. | 370/419 |
| 2005/0177822 A1 | 8/2005 | Kuch et al. | |

(Continued)

OTHER PUBLICATIONS

Alexander et al., Method and Apparatus for Identifying Access States for Variables.

(Continued)

*Primary Examiner*—Matt Kim
*Assistant Examiner*—Ryan Dare
(74) *Attorney, Agent, or Firm*—Duke W. Yee; Herman Rodriguez; Gerald H. Glanzman

(57) ABSTRACT

A method, apparatus, and computer instructions in a processor for associating a data type with a memory location. The type is associated with a location by means of metadata that is generated and manipulated by hardware instructions that are typically generated by a compiler as it generates the other instructions that comprise the machine code version of a program. A determination is made as to whether a data value about to be stored is of the required data type for that location. The hardware indicates an error condition if the types do not match.

10 Claims, 7 Drawing Sheets

U.S. PATENT DOCUMENTS

2005/0257092 A1  11/2005  Alexander et al.

OTHER PUBLICATIONS

Alexander et al., Method and Apparatus for Data-Aware Hardware Operations.

Alexander et al., Method and Apparatus for Data-Aware Hardware Arithmetic.

Alexander et al., Method and Apparatus for Implementing Assertions in Hardware.

* cited by examiner

FIG. 6
```
subroutine foo(a,b){               /* 602
    float a, b, c[100];            /* 603
606 ~ int n,m;
    int pointer p;   // p is supposed to point to a location containing an integer /* 608
618 ~ c[0] = 1.0;
    p = &m;          // p contains (points to) the location of m /* 620
622 ~ for (n=1; n < 100; n++){
    ## Assert c[n] < 1000.0  ~ 610
624 /* c[n] = a + m*c[n-1];
    bar(*p,b);       // call subroutine bar, passing it the integer ~ 626
    value m
    }
}
subroutine bar ( j,x ){ ~ 604          600
    int j;
    float x;
    ......
}
```
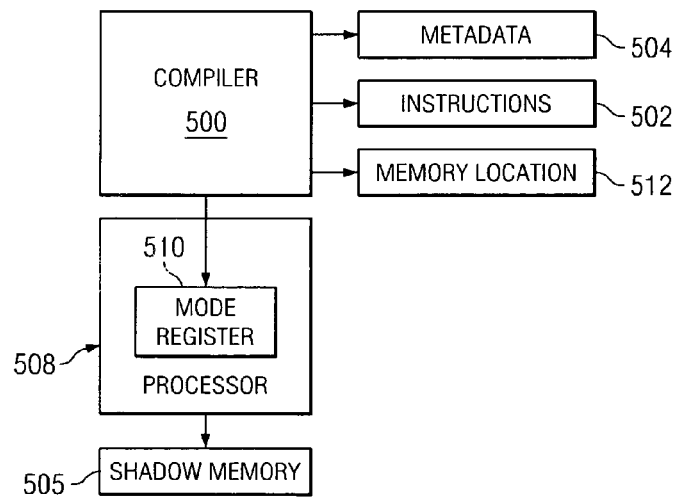
FIG. 5
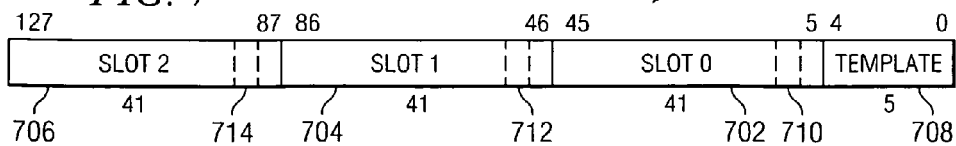
FIG. 7

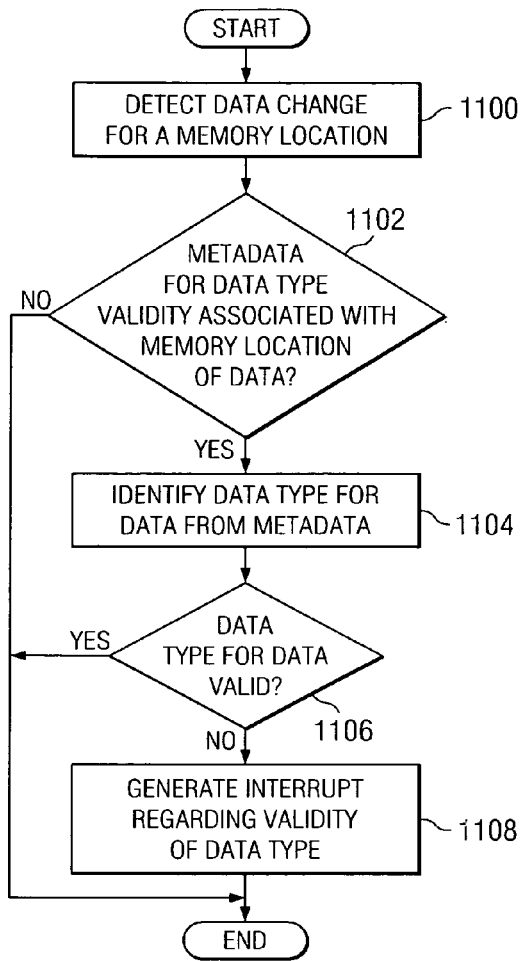
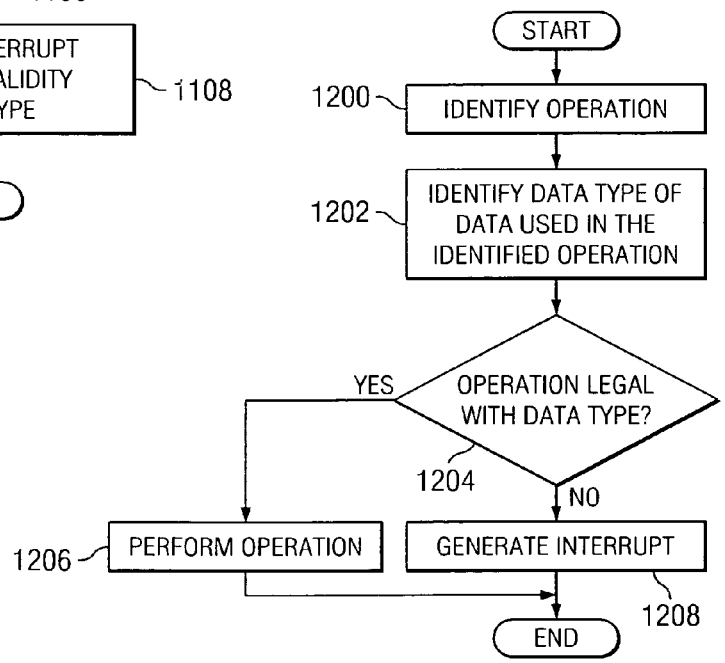

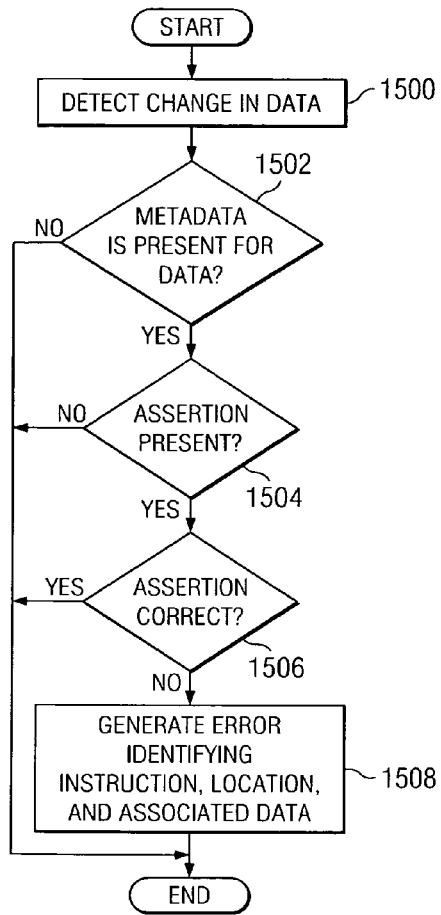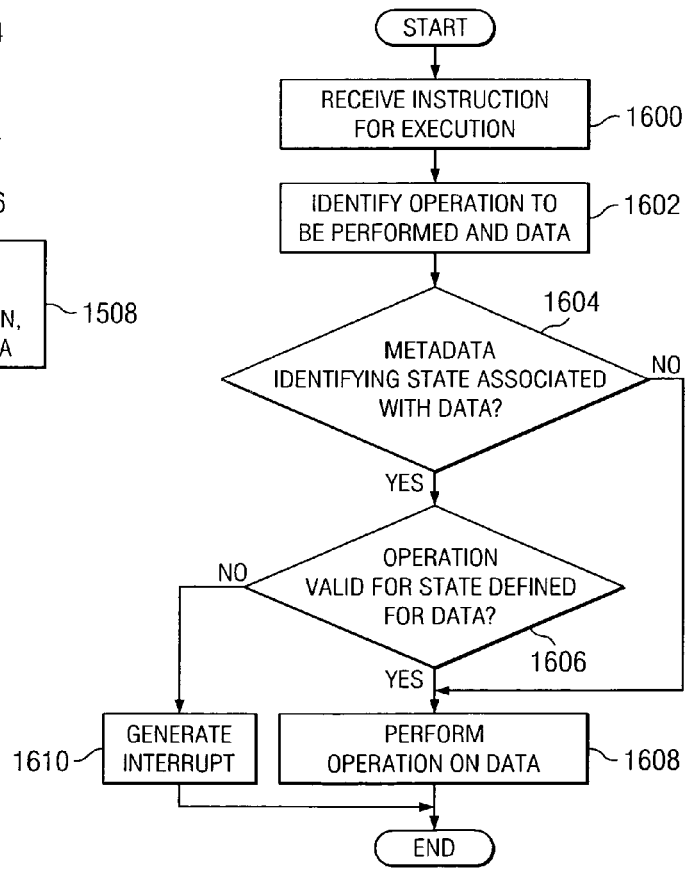

METHOD AND APPARATUS FOR HARDWARE AWARENESS OF DATA TYPES

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sept. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Maintaining Performance Monitoring Structures in a Page Table for Use in Monitoring Performance of a Computer Program", Ser. No. 10/757,250, filed on Jan. 14, 2004; "Method and Apparatus for Providing Pre and Post Handlers for Recording Events", Ser. No. 10/757,192, filed on Jan. 14, 2004; "Method and Apparatus for Determining Computer Program Flows Autonomically Using Hardware Assisted Thread Stack Tracking and Cataloged Symbolic Data", Ser. No. 10/803,663, filed Mar. 18, 2004; "Method and Apparatus for Autonomically Moving Cache Entries to Dedicated Storage When False Cache Line Sharing is Detected", Ser. No. 10/757,227, filed on Jan. 14, 2004; "Method and Apparatus for Optimizing Code Execution Using Annotated Trace Information Having Performance Indicator and Counter Information", Ser. No. 10/757,197, filed on Jan. 14, 2004; "Method and Apparatus for Identifying Access States for Variables", Ser. No. 10/835,482, filed Apr. 29, 2004; "Method and Apparatus for Data-Aware Hardware Operations", Ser. No. 10/835,105, filed Apr. 29, 2004; "Method and Apparatus for Data-Aware Hardware Arithmetic", Ser. No. 10/835,484, filed on Apr. 29, 2004; and "Method and Apparatus for Implementing Assertions in Hardware", Ser. No. 10/835,485, filed Apr. 29, 2004.

BACKGROUND OF THE INVENTION

1. Technical Field

The present invention relates generally to an improved data processing system and in particular to a method and apparatus for processing data. Still more particularly, the present invention relates to a method, apparatus, and computer instructions for providing hardware assistance for program reliability and correctness.

2. Description of Related Art

In writing code, programmers use different languages to generate software systems. These software systems may range from email server and handling systems to mission critical systems, such as the software systems used by various stock exchanges and banks. In performing these tasks, a programmer may generate code which is not correct. Programs have semantic properties and syntactic properties. Semantic properties relate to behavior, while syntactic properties relate to well-formedness. The semantic properties of the program may be checked for correctness statically during compile time and dynamically during runtime. Errors in program correctness may result in failures during execution or in incorrect results being generated by the system software. Additionally, when programs are compiled from a source code to a target code, the compiler used may not always provide a correct transformation of the code.

Currently, formal verification, verifying compilers, thorough testing of code, and runtime software checks are used to verify or insure program correctness. In practice, large software systems will still exhibit unexpected behavior even through the use of these techniques. Compilers often have bugs and even when correct can only add runtime software checks that are thought of by the compiler. Further, testings are often performed on debug versions of software systems being developed, rather than on the exact version of the code used by customers. This situation requires that changes made to the debug version also are made to the version that is to be used by customers. If the different versions are not synchronized, then correct operation in a debug version does not necessarily result in the same operation in the customer version.

Unanticipated behavior in system software is annoying. In the case of mission critical systems, this situation may be disastrous if systems fail or generate incorrect results because program correctness did not occur. Therefore, it would be advantageous to have an improved method, apparatus, and computer instructions for increasing the reliability of software by providing additional checks of program correctness at runtime.

SUMMARY OF THE INVENTION

The present invention provides a method, apparatus, and computer instructions in a processor for associating a data type with a memory location. The type is associated with a location by means of metadata that is generated and manipulated by hardware instructions that are typically generated by a compiler as it generates the other instructions that comprise the machine code version of a program. A determination is made as to whether a data value about to be stored is of the required data type for that location. The hardware indicates an error condition if the types do not match.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram illustrating components used for generating metadata, such as data types, assertions, and valid operations in accordance with a preferred embodiment of the present invention;

FIG. 6 is a diagram of code processed by a compiler at compile time in accordance with a preferred embodiment of the present invention;

FIG. 7 is a diagram illustrating a bundle in accordance with a preferred embodiment of the present invention;

FIG. 11 is a flowchart of a process for determining whether data in a memory location is of a valid data type in accordance with a preferred embodiment of the present invention;

FIG. 12 is a flowchart of a process for identifying whether an operation that is to be performed by a functional unit can be legally performed in accordance with a preferred embodiment of the present invention;

FIG. 15 is a flowchart of a process for illustrating steps in checking the validity of an assertion in accordance with a preferred embodiment of the present invention; and FIG. 16 is a flowchart of a process for determining the state of data in memory locations in accordance with a preferred embodiment of the present invention.

DETAILED DESCRIPTION OF THE PREFERRED EMBODIMENT

Figure 1:
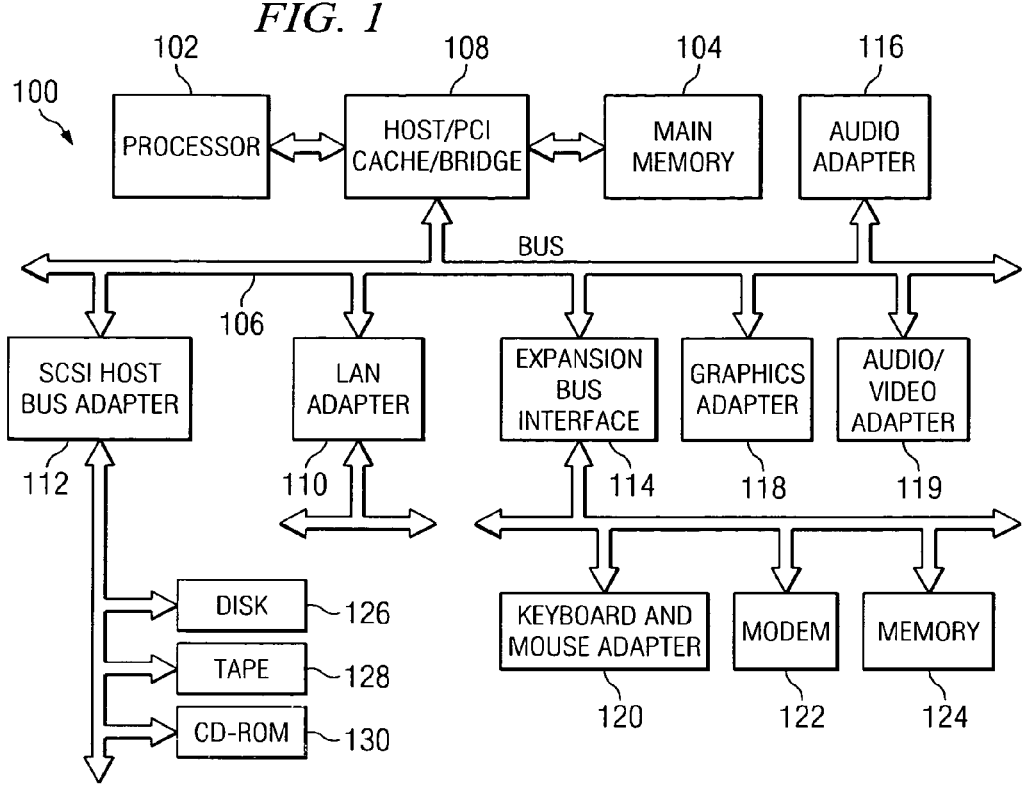
FIG. 1 is a block diagram of a data processing system in which the present invention may be implemented.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
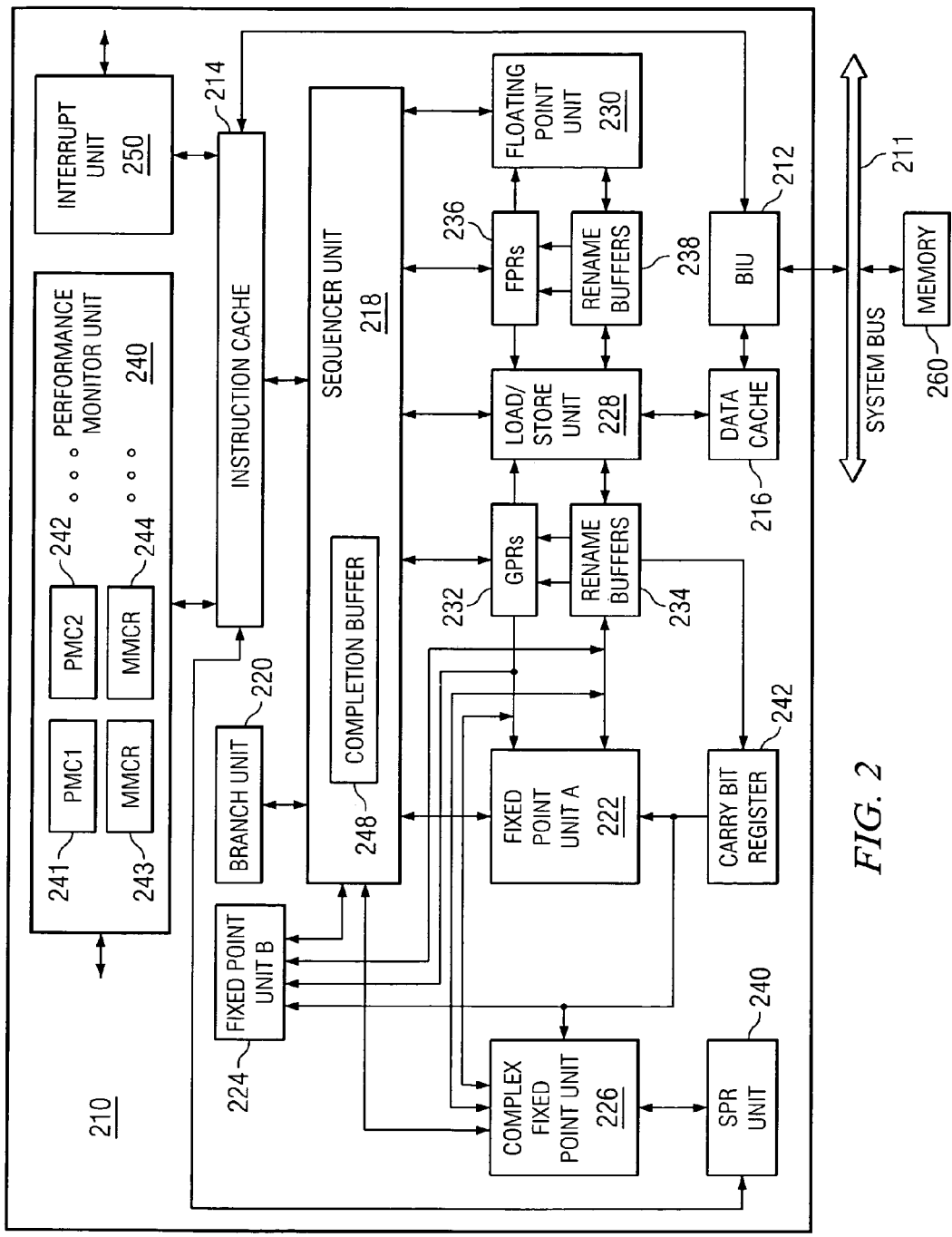
FIG. 2 is a block diagram of a processor system for processing information in accordance with a-preferred embodiment of the present invention.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 242. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 240.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or CA register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer unit 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

A completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes processor monitoring unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 26. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides a method, apparatus, and computer instructions for providing hardware awareness of the type of data stored in a given location. The hardware in a processor may perform checking of data types at runtime. This awareness is provided through associating metadata with a section of memory. This section of memory may be a section of memory location or may be a range or set of memory locations. A range of memory locations is a contiguous set of memory locations, while a set of memory locations may be noncontiguous. These memory locations may include registers. The metadata specifies a type of data, also referred to as a data type that is stored or supposed to be stored in a section of memory. The hardware, such as, for example, processor functional units are configured to access and manipulate this metadata. These processor functional units include, for example, a fixed point unit, a load store unit, and a floating point unit. Other processor units in hardware include a data cache and an instruction cache. Further, instructions are included in the code for a program to correctly specify the data types for different memory locations.

Figure 3:
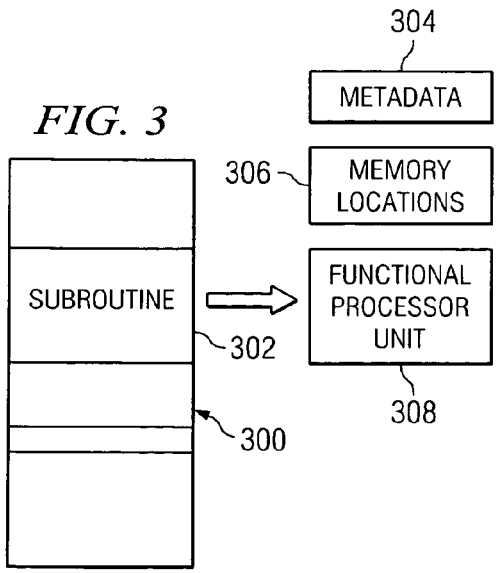
FIG. 3 is a diagram illustrating marked code for identifying awareness of data types in accordance with a preferred embodiment in the present invention.

Turning now to FIG. 3, a diagram illustrating marked code for identifying awareness of data types is depicted in accordance with a preferred embodiment in the present invention. In this figure, code 300 may be marked in a manner that allows for awareness of data types by hardware, such as processor function units during execution of code 300. In other words, an instruction may be included to set a mode in the processor to enable these hardware functions for data awareness. Further, particular instructions may be marked using indicators to indicate that memory locations associated with or manipulated by marked instructions should be processed using data awareness features provided by the hardware in accordance with a preferred embodiment of the present invention.

Instructions may be inserted into code 300 by a compiler to include instructions for generating and associating metadata with memory locations that are initialized or allocated by code 300. This generation and association of metadata may be performed for both static memory locations and dynamically allocated memory locations. The marking of sections within code 300 may involve all memory locations or those for particular sections of code, such as subroutine 302.

In this example, code 300 is compiled code. Metadata 304 is generated during compile time and associated with memory locations 306. In this manner, when an instruction is executed that involves accessing data within a memory location in memory locations 306, functional processor unit 308 checks metadata 304 to determine whether the type of data in the memory location matches the data type specified for the memory location in metadata 304. This memory location may be, for example, a system memory or a register. When data is loaded into a register for an operation, the address of the memory location from which the data was fetched is used by functional processor unit 308 to identify the metadata stating the data type for that memory location.

Similarly, when data is stored to memory, the hardware can check to see if metadata specifies a data type for that location. If metadata does provide such a specification, the hardware determines whether the data about to be stored there is of the correct type. For example, if an instruction, such as ST FP1, mem ("store the contents of floating point register 1 into memory location mem"), is executed, the hardware can see if metadata exists specifying a data type for location mem. If this metadata is present, the hardware verifies that the data type specified for mem is float. If the specified data type is not float, an exception can be thrown. In this example, it is known that the content of FP1 is in fact a float because the content was checked when the value was stored into FP1.

Instructions inserted into code 300 may cause the data type for a memory location in memory locations 306 to be set in metadata 304 when a value is stored in the location. Prior to a value being stored in a memory location, the data type for the memory location in memory locations 306 is set or marked as unknown in metadata 304. These data types may be set in association with the declaration of variables by code 300. For example, if code 300 declares a variable as a floating point variable metadata is stored in metadata 304 containing the data type for use by hardware in the processor, such as functional processor unit 308.

Figure 4:
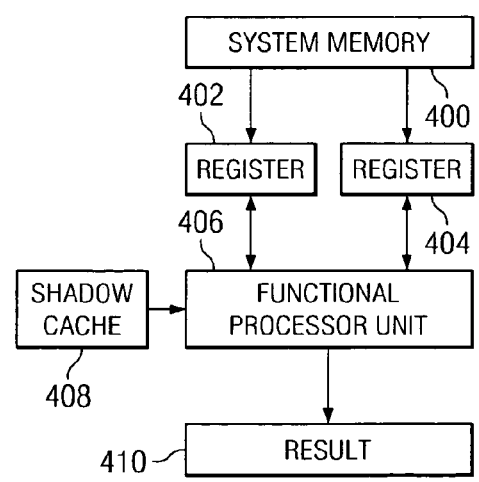
FIG. 4 is a block diagram illustrating hardware awareness of data types in accordance with a preferred embodiment of the present invention.

With reference next to FIG. 4, a block diagram illustrating hardware awareness of data types is depicted in accordance with a preferred embodiment of the present invention. In this example, data from system memory 400 may be loaded into register 402 and register 404 for use by functional processor unit 406 in executing an instruction. Functional processor unit 406 may take various forms, such as a floating point unit, a fixed point unit, or a load/store unit.

Functional processor unit 406 determines whether the data type in a memory location, such as register 402 or register 404 is valid. A memory location also may be another memory, such as system memory in addition to being a register. This metadata may be stored in various ways, for example, metadata for the values in registers 402 and 404 may be stored in extra bits for those registers or in a memory, such as shadow cache 408. If the metadata is stored as extra bits in a register, the metadata contains the data type of the data. If the memory is located in shadow cache 408, the metadata includes an address that is used to identify a particular entry in shadow cache 408 for defining the data type for a memory location when data from that address is loaded into a register for processing. For example, if data is loaded into register 402 from a memory location in the system memory, the address of that system memory is used to identify the data type. If the register is required to have a particular data type every time, the address may be that of the register or of the memory location from which the data in the register originated.

Based on the data type defined by the metadata and the actual type of data in the register or memory location result 410 is generated to determine whether the data is valid. For example, the data type for register 402 and register 404 may be defined as a floating point value in the metadata associated with register 402 and register 404. If the type of data in register 402 is not a normalized floating point value, functional processor unit 406 generates result 410 with an indication that the data is not of a valid data type.

Turning to FIG. 5, a block diagram illustrating components used for generating metadata, such as data types, assertions, and valid operations is depicted in accordance with a preferred embodiment of the present invention. In this example, compiler 500 supports directives, supplied by the programmer, that indicate the metadata to be generated. In response to these directives the compiler generates instructions for setting, changing, and reading metadata. These are new instructions, not present in current processing units, which are added in these illustrative examples to an Instruction Set Architecture (ISA) to enable a preferred embodiment of the present invention. These additional instructions are executed by the hardware just as instructions such as loads, stores, and adds are executed. Further, these instructions are typically generated by compiler 500 or an assembler as part of processing, such as that of variable declarations and type conversions.

Because memory locations containing the stack or other areas of scratch memory may contain data of different types at different times, the metadata associated with such memory locations may be changed many times during the execution of instructions 502. If hardware embodying the mechanisms of the present invention only allows enough metadata for a subset of the memory locations, then instructions for changing the binding of metadata to memory locations during execution may be included in the ISA because different subsets of data may be most important for reliability at different stages in the execution of instructions 502.

In some cases, the metadata may simply indicate data types and the processor may have its own algorithm for determining compatibility. In this type of implementation, the processor does not necessarily need to have extra instructions for the validation. The compiler, however, does use additional instructions for setting and resetting data types.

In compiling the source code, compiler 500 may generate instructions 502 for execution and for identifying data types. As instruction or data cache pages are loaded into memory during execution of instructions 502, the operating system program loader/linker, reads metadata 504 generated by compiler 500 and loads metadata 504 into a memory, such as shadow memory 505 or as extra bits associated with designated words in the data itself.

In one embodiment the format simply has a shadow cache entry for each of its block or sector references and moves metadata 504 to its corresponding shadow entry or entries in shadow memory 505. Instead of using shadow memory 505, the internal format of the data cache itself may be modified to contain metadata 504. In embodiments where the data itself is modified to contain the metadata, either the loader updates the data to contain the appropriate metadata and work areas or compiler 500 generates the code to generate metadata 504. In either case, after the data is loaded, metadata 504 is present.

In addition, metadata 504 may be placed into shadow memory 505 in association with instructions 502. Compiler 500 produces instructions that produce and manipulate metadata. By placing metadata 504 in shadow memory 505, the generation of metadata 504 may be performed dynamically.

Instructions 502 then may be executed by processor 508. Checking of data types for data using metadata 504 occurs when the data is accessed during execution of these instructions. Compiler 500 may generate additional instructions to turn checking on or off during portions of a program. These instructions might set a register, such as mode register 510 in processor 508, to enable hardware assistance. When this register is set, processor 508 looks at metadata 504 in shadow memory 505 when executing instructions 502 to determine whether data types in metadata 504 are associated with memory locations that are being accessed during execution of instructions 502. If mode register 510 is not set, then metadata 504 is ignored when instructions 502 are executed. Alternatively, checking might be enabled or disabled by an outside agent such as the operating system or a dynamic debugger.

With the use of mode register 510, the same code used in debugging also may be used for actual client or customer use. When mode register 510 is turned off, checking of data types may be turned off.

This feature allows for selection and monitoring of instructions to occur without having to modify the program. This feature allows for the same program that is debugged or checked to be used as the actual production or customer code. As a result, different versions of code are unnecessary. Setting mode register 510 causes processor 508 to look for metadata 504 in shadow memory 505 without having to modify instructions 502. In these examples, metadata 504 takes the form of data type definitions that are used by processor 508, identify data types, and perform other data related checks and operations.

In a specific example, assume a program is written in a higher level language, such as C or Java and translated into a binary code, such as instructions 502 by compiler 500. In a strongly-typed language, such as Java, variables have a single, known data type that never changes for the duration of a program execution. The same is true of expressions. Expressions can be "cast" to different data types, but the result of a cast is a different, distinct expression. Thus, compiler 500 knows and, given suitable machine instructions, can convey to the hardware the data type of all data in memory operated on by the program that compiler 500 is translating.

In a weakly-typed language such as C, compiler 500 knows and can convey the data type for data stored in some, but not all, memory locations. Unions, pointer arithmetic, and other language features that result in aliasing restrict the ability of compiler 500 to know data types. Further, use of these language features is discouraged by people concerned with program reliability for other reasons. The use of such language features in a given program may reduce, but by no means eliminate the usefulness of the mechanisms of the present invention described herein.

For a global or static variable, it is most useful for compiler 500 to issue an instruction setting the metadata associated with the instruction the first time a value is stored in that memory location. Prior to this first storage of data in the memory location, the data type is marked or set as "unknown" in these illustrative examples. If the first such occurrence cannot be determined, the instruction is issued when the memory location is allocated. This situation may require cooperation from the loader, depending on language semantics and implementation. All such memory locations are designated as having unknown data types at program termination, possibly by the operating system.

Similarly, data allocated from a heap can have its metadata set after the call to malloc( ) in C or by new( ) in Java. These calls are used to dynamically allocate memory for data during execution of the instructions. The data type for these memory locations are reset to unknown by the free( ) routine in C or by the garbage collector in Java. These calls are used to free or deallocate memory.

In the illustrative examples, temporary data such as method arguments and local variables located in the stack have their metadata set at stack frame allocation, and these memory locations are reset to unknown when the routine is exited and the stack frame is deactivated. This action can be accomplished by instructions that the compiler places in routine prologs and epilogs.

Data types in higher level languages can be arbitrarily complex, and the mechanism of the present invention does not make the hardware aware of arbitrary types in these examples. A memory location containing a pointer could be part of a linked list, a tree, or any of an infinite number of other data structures unknowable by hardware, but the fact that the memory location contains a pointer is knowable and potentially useful. In these illustrative examples, primitive data types including integer, floating point, double, and pointer are described for purposes of illustration. Using the mechanisms of the present invention, hardware can easily check these types of data for illegal values, such as pointers outside the range of virtual memory available to the running process or unnormalized floats.

Further, using the mechanisms of the present inventions, hardware is able to detect the generation of illegal values when these illegal values are about to be stored into a memory location. In this manner, the instruction that is at fault is exposed, rather than the typical case today when such illegal values are only discovered at first use. Such a feature greatly aids in debugging the processes and thus contributes to program reliability and correctness.

Turning now to FIG. 6, a diagram of code processed by a compiler at compile time is depicted in accordance with a preferred embodiment of the present invention. In this example, code 600 is an example of code that may be compiled using a compiler, such as compiler 500 in FIG. 5. At compile time, the compiler generates machine or binary code to implement code 600, which is in a source code format. When enabled, the compiler also performs additional processing in accordance with a preferred embodiment of the present invention.

Line 602 is a call to a subroutine foo. In most languages, whoever calls the subroutine foo in line 602, causes copies of the values of variables a and b to be placed in a scratch area of memory called the "stack". Variables a, b, and c are defined in line 603 as having a data type of float. Since this is a scratch area, previous values of an unknown type may be present. As a result, the compiler compiles this instruction to generate a couple of the new instructions that set or create metadata associating a data type "float" with the memory locations of these copies of the values a and b. Similar new instructions are generated at the beginning of the subroutine bar for values j and x in line 604. These instructions associate the data types "integer" and "float" with two more memory locations in this illustrative embodiment.

In lines 606 and 608, in addition to generating the instructions that reserve space in memory for these declared variables, the compiler generates new instructions that create metadata associating the data type "float" with the memory locations of the 100 elements of c and the data type "integer" with the memory locations of n and m. The data types "float" has already been associated with the variables a and b when the compiler processed line 602.

With respect to line 608, the compiler generates instructions that create metadata associating type "pointer-to-integer" with the location of p. In this illustrative example, the type of data that the pointer points to also is indicated. In this example, the pointer points to an integer.

Upon encountering the data assertion in line 610, the compiler generates instructions to generate metadata associating this data invariant with all 100 elements of the variable c. This machine code is placed either near the beginning of the subroutine, with the other instructions generating metadata about c, or just before the beginning of the loop, and not inside the loop where the assertion was placed by the programmer.

Additionally, the compiler generates instructions that create metadata associating language-specific rules or information about the whole routine or the whole program for the hardware to use at runtime. These instructions are typically placed at the beginning of the routine or program in the illustrative examples. This generated metadata would specify which operations are legal on which types of data or even whether such checks should be performed at all in the case of trusted modules, and rules about mixed-mode arithmetic and automatic casting, because these issues are language-specific.

At runtime, as the hardware executes the instructions generated by the compiler that implements code 600, the hardware performs additional processing in addition to the instructions shown in code 600. In these illustrative examples, the additional processing is performed by hardware, such as different processor functional units and components in a processor executing the instructions for code 600.

For example, before the machine instruction equivalent of line 602 is executed, the instruction or process that called the subroutine foo placed values in two memory locations in the stack. Because metadata is present specifying the data type for these two memory locations, the processor checks, as the values are being so placed in the stack, that the values do indeed correspond to legal, normalized floating point numbers. This check is made because metadata identifying the data types for these values are associated with the memory locations for the values.

When the execution of code generated by the compiler reaches the machine instruction corresponding to the instruction at line 618 that stores the value 1.0 into c[0], the processor determines whether the value is a legal, normalized float value, because metadata is present defining the value in this element in the array. Also, additional metadata is present associating a data invariant with c. As a result, the processor checks to see whether 1.0 is less than 1000.0. Although both of these checks are usually redundant, since most modern compilers can actually check this extremely simple case at compile time, it is probably impractical to avoid occasional redundancies because the processor has no way of knowing the sophistication level of the compiler that generated the code. As a further note, all value-checking also is helpful when code bugs that overwrite memory erroneously are present.

When the process executes machine code generated for line 620, the machine instruction that stores the address of m into p causes the processor to perform two checks in this illustrative example because metadata is present specifying the data type for the memory location of value p. The processor checks to see whether the value placed in p is a legal pointer value, within an in-range address. Further, the processor determines whether the address in p contains an integer.

When the execution of the machine instruction equivalent of the instruction in line 622 is reached, the processor checks to see whether legal values are present as new values are stored in n.

When the execution of the program reaches the equivalent of line 624 in the compiled code, the expression to the right of the equal sign takes many machine instructions to implement. Several of these machine instructions trigger processor checks, depending on language-specific rules specified by the programmer in the metadata. For example, the processor may check that (1) "−" is a legal operation on n and 1, (2) "*" is a legal operation on m and c, and (3) "+" is a legal operation on a and the other expression. If the multiplication between the integer and the float is legal, the processor also checks to determine whether metadata for a casting rule is present for that situation. If this type of metadata is present, the processor will perform the cast operation to convert or change the data type. If mixed mode operations are allowed, the data types for the values may be cast or converted to the required data types. These required data types are set forth in the metadata.

Finally, when the processor encounters the machine instruction that stores the result into c[n] for line 624, the processor determines whether the value is a legal, normalized float based on the metadata defined for the memory location. If the value is not a legal float, the processor determines whether the metadata contains a casting rule. If a cast rule is defined in the metadata, the processor performs the cast operation and then performs the store operation. Otherwise, the processor generates an interrupt. Additionally, if the processor performs the store operation, the processor first determines whether the value is less than 1000.0.

With respect to the instruction at line 626 at compile time, the compiler generates instructions placing copies of the vales of m and b on the stack and generates instructions that generate metadata associating types with these two locations, as mentioned above. Next, when the execution of the machine code reaches the equivalent of the instruction in line 626, at runtime, as these two values are stored into the locations on the stack, the processor checks to see whether the values for the memory locations are legal values using the metadata defining the data types for the memory locations.

Turning next to FIG. 7, a diagram illustrating a bundle is depicted in accordance with a preferred embodiment of the present invention. Bundle 700 contains instruction slot 702, instruction 704, instruction slot 706 and template 708. As illustrated, bundle 700 contains 128 bits. Each instruction slot contains 41 bits, and template 708 contains 5 bits. Template 708 is used to identify stops within the current bundle and to map instructions within the slots to different types of execution units.

Spare bits within bundle 700 are used to hold indicators of the present invention. For example, indicators 710, 712 and 714 are located within instruction slots 702, 704, and 706, respectively. These indicators may take various forms and may take various sizes depending on the particular implementation. Indicators may use a single bit or may use multiple bits.

These fields may be used for metadata to define data types and other data checking information for memory locations. In this type of implementation, the different slots are words with additional bits in memory locations with the metadata being stored in place of the indicators. Of course, the memory locations may contain other sizes depending on the particular implementation.

Alternatively, template 708 may be used to contain a bundle of related indicators, so that one bit is used to identify all the instructions in a bundle. Also, the bundle itself could be extended to be 256 bits or some other number of bits to contain the extra information for the performance indicators or flags used to indicate the type of checking that is to occur for the entire bundle or specific instructions in the bundle. For example, if a instruction in a bundle is a branch instruction, the flag may indicate that checks should be performed against branched instructions. If the bundle contains an instruction for a floating point operation, the operands for this operation should be floating point operands. In this case, the instruction type itself may be used to identify the type of operands.

Figure 8:
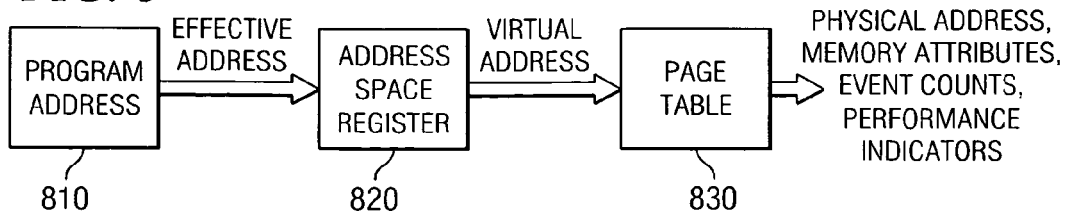
FIG. 8 is an exemplary block diagram of data flow in which a page table is used to translate the memory address specified by the program into a physical address in accordance with an exemplary embodiment of the present invention.

FIG. 8 illustrates an exemplary block diagram of data flow in which a page table is used to translate the memory address specified by the program into a physical address in accordance with an exemplary embodiment of the present invention. As shown in FIG. 8, program address 810 (for data or instruction) is translated to a virtual address by way of the address space register 820 using one of the various means of specifying the active address space. The resultant virtual address is used by the processor to search page table 830 for a page descriptor in page table 830 that matches the virtual address. The contents of the matching page descriptor commonly contain the physical address and attributes associated with the virtual page. These contents are used to translate the virtual address to a physical address and to determine the attributes of the page (e.g., access rights).

In a further illustrative embodiment, the page table is expanded to include additional fields for each entry for storing metadata used in providing hardware awareness of data types, as well as other information, such as the type of access permitted to data in selected memory locations, casting rules, and assertions. When a process accesses the page table to perform virtual to physical page address mapping, these additional fields may be queried, values from these fields retrieved, and values in these fields updated based on the particular event causing the access to the page table.

Alternatively, to avoid any degradation of performance, the metadata in these fields may be cached in processor resources similar to a Translation Look-aside Buffer (TLB) or an Effective to Real Address Translation Buffer (ERATB). For example, a Data Type Look-Aside Buffer (DTLAB) may be provided in which the virtual to real address translation information and the data type information provided in the above fields of the page table may be cached. When an instruction or data address access request is received, a lookup of the program or virtual address may be performed in the DTLAB to obtain both the address translation information and the metadata associated with memory locations. If the program or virtual address is not present in the PILAB, the page table may be consulted to obtain this information.

Figure 9:
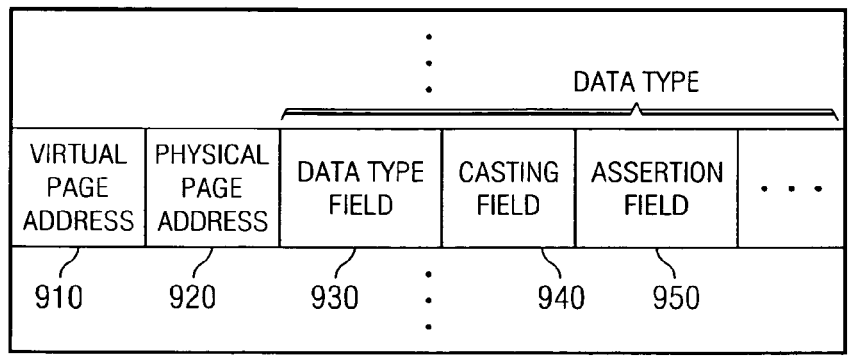
FIG. 9 is an exemplary page table entry in accordance with an exemplary embodiment of the present invention.

FIG. 9 illustrates an exemplary page table entry in accordance with an exemplary embodiment of the present invention. As shown in FIG. 9, page table entry 900 includes field 910 for storing a virtual page address, field 920 for storing a physical page address, and additional fields, data type field 930, casting field 940, and assertion field 950, for storing metadata relating to data in memory locations. These additional fields are used by the hardware in determining the validity of data in memory locations, determining whether to perform a cast operation, and checking assertions and statements about values of variables. These assertions also are referred to as data invariance.

For example, in a similar manner that metadata are associated with memory locations as described above, the metadata may be associated with these memory locations within the page table. Thus, when determining whether data in a memory location is associated with metadata, the virtual address of the data in the memory location may be used to identify an entry in the page table and the values stored in data type field 930, casting field 940, and assertion field 950 may be checked to see if metadata is associated with the physical page or a portion of the physical page. That is, if the offset associated with the virtual address falls within an offset range identified in data type field 930, casting field 940, and/or assertion field 950 has metadata stored therein, then the data in the memory location corresponding to the virtual address is associated with metadata for use by the processor.

It should be appreciated that while FIG. 9 shows only a single field for storing a data type, a single field for storing a cast, and a single field for storing an assertion, the present invention is not limited to such. Rather, any number of fields for storing a plurality of numbers and types of metadata for use in checking and performing operations on data may be used without departing from the spirit and scope of the present invention.

Figure 10:
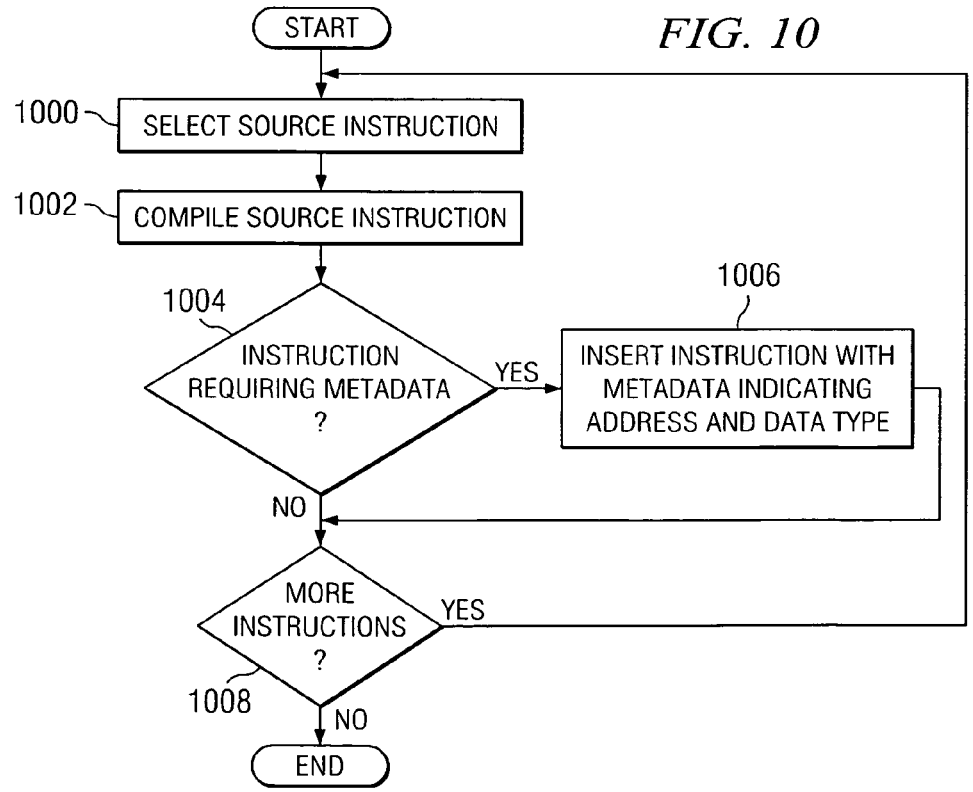
FIG. 10 is a flowchart of a process for adding instruct in accordance with a preferred embodiment of the present invention.

With reference now to FIG. 10, a flowchart of a process for adding instructions to generate metadata for a program is depicted in accordance with a preferred embodiment of the present invention. The process illustrated in FIG. 10 may be implemented in a compiler, such as compiler 500 in FIG. 5. The process illustrated in this figure describes a process for generating compiled code, that creates or manipulates metadata for use by hardware.

The process begins by selecting a source instruction for processing (step 1000). Next, the source instruction is compiled (step 1002). In step 1002, a single source instruction may result in more than one machine instruction being generated. Thereafter, a determination is made as to whether the source instruction is one requiring metadata (step 1004). The instruction may be, for example, one that requires data type checking in these illustrative examples. This instruction may be any instruction that involves a memory location, or a cast, or a data invariant assertion. Alternatively, specific instructions or groups of instructions may be selected for generating metadata.

With respect to the placement of metadata, in some cases, the metadata is present before the instruction is executed, such as with metadata for an insertion. In other cases, the metadata may be present after execution of an instruction, such as allocated memory.

As an example, some code modules may be trusted because these code modules have been formerly verified. For these types of modules, avoiding additional overhead associated with hardware checking may be desirable. For these and other reasons, it may be useful to associate hardware readable metadata with modules or groups of instructions, such as subroutines, methods, or even basic blocks, to specify the type of hardware checks during execution. This metadata is typically generated by the compiler and may be triggered by user input in the form of assertions in a program. For example, to indicate to the compiler that subroutine foo is trusted and that no hardware type checking should be done white executing the instructions that comprise foo, the very first line inside foo could be "##Assert trusted foo".

If the instruction is one selected for data type checking, a machine instruction generating metadata indicating an address and data type is inserted into the code (step 1006). The machine instructions that create or manipulate metadata go right in amongst the other instructions that the compiler is generating, usually are placed right before or right after the machine instruction implementing the selected instruction. This placement may vary depending on the type of instruction. For example, in the case of some invariants such as line 610 in FIG. 6, the compiler would probably move the instructions generating the metadata outside and before the loop for performance, although the checks would still be located inside the loop.

In step 1006, the metadata may be included as part of the memory location or the instruction may cause the metadata to be placed into a shadow memory or page table as described above.

Next, a determination is made as to whether more instructions are present for compiling (step 1008). If additional instructions are not present, then the process terminates. In step 1008 if additional instructions are present, then the process returns to step 1000 as described above.

In this manner, the process illustrated in FIG. 10 provides for the generation of metadata for use in validating data types by hardware. Of course, metadata may be generated using other mechanisms such as hand-coding in assembly language. Further, the metadata could be generated dynamically at runtime, depending on the particular implementation.

With reference now to FIG. 11, a flowchart of a process for determining whether data in a memory location is of a valid data type is depicted in accordance with a preferred embodiment of the present invention. The process illustrated in FIG. 11 may be implemented in a processor functional unit, such as, for example, load store unit 228 in FIG. 2.

The process begins by detecting data change for a memory location (step 1100). Next, a determination is made as to whether metadata for data type validity is associated with the memory location of data (step 1102). This step is used to determine whether checking for data type validity is to be performed in these illustrative examples. If metadata for data type validity is associated with the location of data, then the data type is identified for data from metadata (step 1104). This data type is the data type that is expected for the data in the memory location.

Next, a determination is made as to whether the data type for the data is valid (step 1106). If the data type for the data is not valid then the interrupt regarding validity of data type is generated (step 1108), with the process terminating thereafter. In these illustrative examples, an interrupt is used as a specific type of error indication. The mechanism of the present invention may be implemented using other types of error indications in addition to or in place of an interrupt. For example, the error indication may be an exception for metadata. The metadata may, for example, indicate that an invalid type is present using a code or error number.

Referring back to step 1102, if metadata for data type validity is not associated with the location of data, then the process terminates. In this instance, no determination is made as to whether the data is of a valid data type.

In step 1106 if the data type for the data is valid, then the process terminates. In this case, the operation, such as a load or store operation is performed.

In this manner, the mechanism of the present invention provides an ability for hardware in a processor to check for the validity of a data type for data in a memory location. This feature may be turned on and off such that the process provided in the hardware is never initiated or may be initiated at different times. The initiation of this feature may be made through the setting of a register in a processor, such as mode register 510 in FIG. 5. Further, this process may be performed by other types of processor components other than a load store unit. For example, a dispatcher or a functional unit, such as a floating point unit may be a component in which this process is implemented.

With reference now to FIG. 12, a flowchart of a process for identifying whether an operation that is to be performed by a functional unit can be legally performed is depicted in accordance with a preferred embodiment of the present invention. The process illustrated in FIG. 12 may be implemented in a processor unit, such as a dispatcher or a functional unit. This process is initiated in response to a request or instruction to perform an operation on data in a memory location. This process assumes that a check with respect to the data type for data in the memory location has already been made and that the data is valid for the data type in the manner described above in FIG. 11.

In addition to validating the data type of data in a memory location, it is often useful to determine whether an operation on data can be validly performed. Given the knowledge of data types, the hardware may check the validity of operations. For example, branching to an address contained in a memory location that is of a type integer or float does not make sense, while such an operation is valid if the address in the memory location is a pointer. For a given data type, many illegal operations may be present. For example, floating point arithmetic on integers, floating point arithmetic on pointers, and integer arithmetic on floating point values are illegal operations.

The mechanism of the present invention includes an additional feature in which detection of an illegal operation is made before the operation occurs. Further, information about an illegal operation also may be collected for later use in debugging.

The process begins by identifying an operation to be performed on data (step 1200). Next, the data type of the data used in the identified operation is identified (step 1202). The identification of the data type for the data is made by the hardware identifying the metadata associated with the memory location. In this illustrative example, the data type in the memory allocation has already been validated using the process described with respect to FIG. 11 above.

Next, a determination is made as to whether the operation is legal with the data type (step 1204). For example, if the operation is to add floating point values, a determination is made as to whether the values in the registers are both floating point values. If the operation is legal with the data type, then the operation is performed (step 1206) with the process terminating thereafter.

Referring back to step 1204, if the operation with the data type is not legal, then the interrupt is generated (step 1208) with the process terminating thereafter. The interrupt may include information, such as the instruction, the location of the instruction, and associated data values. This interrupt may be handled by the operating system or by another program, such as a debugging program. Of course, a different type of error indication, such as, for example, an exception or metadata may be generated.

The process performed by the hardware in FIG. 12 provides a mechanism to determine the correctness of operations performed on data. If this process is implemented in a functional unit, the functional unit may be, for example, a floating point unit if the operation performed is to add floating point values. The operations handled by the process in FIG. 12 include arithmetic operations and non-arithmetic operations. Arithmetic operations include adding and subtracting. Non-arithmetic operations include branch and shift operations.

Further, operations may be valid for a given data type under some circumstances or in some higher level languages, but illegal in others. For example, arithmetic operations of any kind on pointers are forbidden in Java, but integer arithmetic on pointers is a valid operation and is common in C programs.

Figure 13:
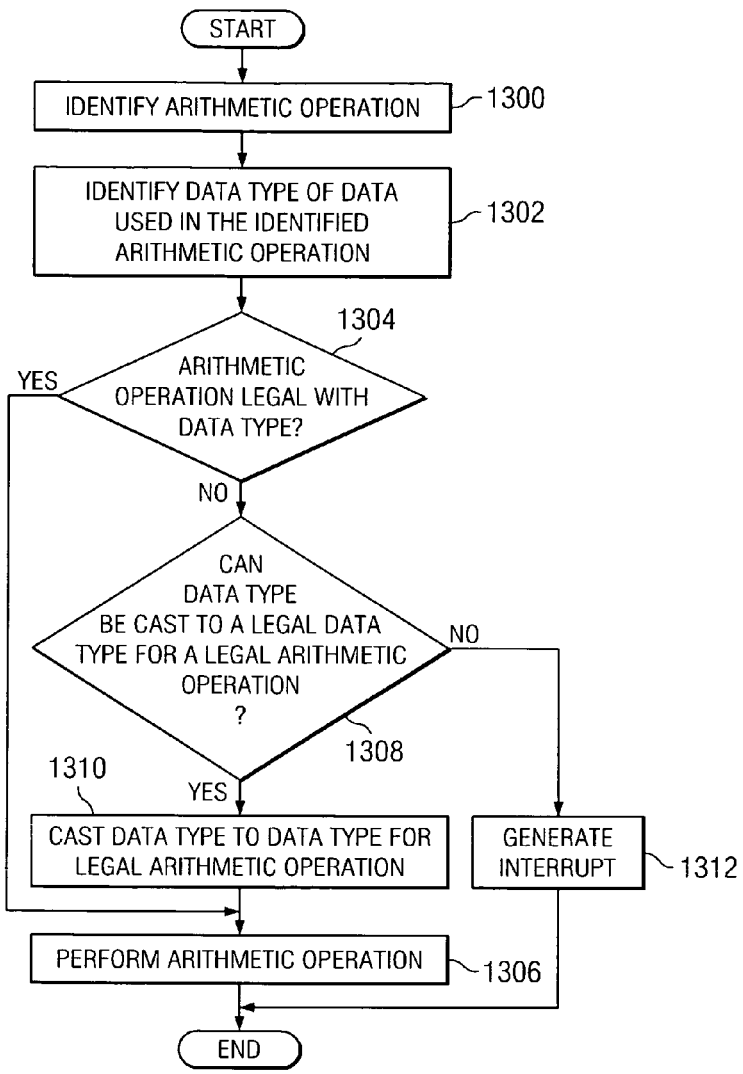
FIG. 13 is a flowchart of a process for correcting data types to perform an arithmetic operation in accordance with a preferred embodiment of the present invention.

With reference now to FIG. 13, a flowchart of a process for correcting data types to perform an arithmetic operation is depicted in accordance with a preferred embodiment of the present invention. The process illustrated in FIG. 13 may be implemented in a processor unit, such as a functional unit or a dispatcher.

The process in FIG. 13 builds upon determining whether an arithmetic operation may be performed on data. If the data type is incorrect, the mechanism of the present invention may cast or change the data type to the one needed for the operation. The change or cast to be performed is specified by the metadata in these illustrative examples. This metadata is associated with a particular instruction, such as a floating point add, or set of instructions, such as subroutines or methods. Such an association is in contrast to association of metadata with memory locations used to validate data types.

This process is initiated in response to a request or instruction to perform an arithmetic operation on data in a memory location. This process assumes that a check with respect to the data type for data in the memory location has already been made and that the data is valid for the data type in the manner described above in FIG. 11.

Still with reference to FIG. 13, the process begins by identifying an arithmetic operation (step 1300). Next, the data type of data used in the identified arithmetic operation is identified (step 1302). Next, a determination is made as to whether the identified arithmetic operation is legal with the data type of the data (step 1304). If the arithmetic operation is legal with the data type, then an arithmetic operation is performed (step 1306) with the process terminating thereafter.

Referring back to step 1304, if the arithmetic operation is not legal with the data type, then a determination is made as to whether the data type can be cast to a data type for a legal arithmetic operation (step 1308). If an invalid data type can be cast to a desired data type, then an invalid data type is cast to the data type that allows for the identified arithmetic operation to be legally performed (step 1310).

The process then proceeds to step 1306 as described above. In step 1308, if the data type cannot be cast to a data type for a legal arithmetic operation, an interrupt is generated (step 1312). This interrupt may include information used to analyze the error. This information may include, for example, the instruction the location of the instruction, and data values associated with the instruction. Of course, a different type of error indication, such as, for example, an exception or metadata may be generated.

In this manner, the mechanism of the present invention allows for data to be cast or changed to a legal data type using metadata associated with the instruction for the operation, such that the operation may be performed. Alternatively, the cast or change may be based on predefined rules implemented into the particular hardware unit.

In code created by programmers, assertions may be included about the state of a program that is required to remain true during execution of the program. These assertions are useful in improving the reliability of programs and code. Examples of assertions include "n must never be negative", "−1.0<x<1.0", etc. Most program assertions are statements about the values of variables; such assertions are sometimes called data invariants. Assertions are typically implemented by extra instructions that the compiler generates that perform runtime checks on the program's state at specified points in the program's execution.

In FIG. 13, the casting is performed with respect to arithmetic operations. This mechanism may be applied to recast data to a required data type for different types of operations other than arithmetic operations, depending on the particular implementation.

The mechanism of the present invention allows for assertions to be implemented in hardware using metadata that may be associated with a given memory location.

Figure 14:
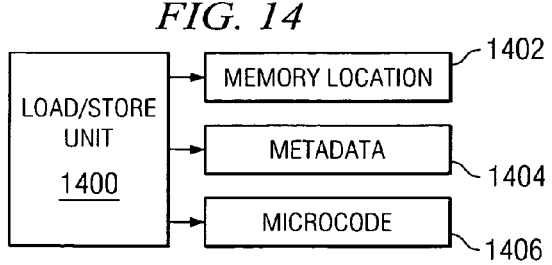
FIG. 14 is a block diagram of a process for illustrating components used in determining whether an assertion is valid in accordance with a preferred embodiment of the present invention.

With reference now to FIG. 14, a block diagram of a process for illustrating components used in determining whether an assertion is true is depicted in accordance with a preferred embodiment of the present invention. In these illustrative examples, the processes may be implemented in hardware, such as load/store unit 1400.

When a value is stored into memory location 1402, a determination is made as to whether metadata 1404 is associated with the data stored into memory location 1402. The assertion may be located in metadata 1404, depending on the complexity of the assertion. As previously discussed, the metadata may be placed in various locations, such as within extra bits, within memory location 1402, in a shadow memory, or even a page table. If implemented within memory location 1402, 3 bits may be used to associate the value with the metadata. Depending on the implementation, the location of the metadata is known to the hardware implementing the mechanisms of the present invention.

In other illustrative embodiments, the assertion may be located in microcode 1406. In this type of implementation, metadata 1404 contains a pointer to microcode 1406. Microcode, in these examples, are the lowest level instructions that directly control a processor. A single machine language instruction typically translates into several microcode instructions. Microcode may be in hardware or software form. In many modern processors, the microcode is hard-wired into the processors.

If load/store unit 1400 detects an invariant violation, an interrupt may be generated to provide information about the violation. Further, implementing assertions in hardware provides an increased reliability advantage over code generated by software because other violations, such as invalid values may be detected using the other mechanism described above in addition to identifying valid values that validate the assertion.

With reference now to FIG. 15, a flowchart of a process for illustrating steps in checking the validity of an assertion is depicted in accordance with a preferred embodiment of the present invention. The process illustrated in FIG. 15 may be implemented in a processor component, such as load/store unit 1400 in FIG. 14.

The process begins by detecting change in data (step 1500). This data may be a value placed into a register in which the value has changed as a result of an operation performed on the value by a functional unit. Additionally the change may be the movement of the data to a memory location from a register or from another memory location. Moving data from a memory to a register does not change the value of the data, but data moved from a register to a memory may have a change. In this case, the hardware, such as load/store unit 1400 in FIG. 14, should check the metadata associated with that memory location.

Next, a determination is made as to whether metadata is present for data (step 1502). If metadata is present for data then a determination is made as to whether an assertion is present (step 1504). This determination may be made by seeing if the assertion is within the metadata or if the metadata points to another data structure, such as microcode, containing the assertion. If the assertion is present in the metadata, then a determination is made as to whether the assertion is correct (step 1506) with the process terminating thereafter.

Referring back to step 1502, if metadata is not present for data, then the process terminates. In step 1504, if an assertion is not present, then the process terminates. In step 1506, if the assertion is not correct then an error, identifying the instruction, its location, the location of the data, the assertion that was violated, and the forbidden value, is generated (step 1508) with the process terminating thereafter. In step 1508, the error generated in these illustrative examples is an interrupt. This interrupt may be handled by the operating system or by some designated program, such as a debugging software tool. Of course, a different type of error indication, such as, for example, an exception or metadata may be generated.

An additional feature that is useful in determining software correctness for use in increasing reliability is to determine whether data accessed during execution of the program has been correctly accessed. In other words, it is useful to know whether the type of access permitted to data in a memory location corresponds to the access that is attempted or initiated on that data in the memory location during execution of code.

The mechanisms of the present invention provide an ability to generate metadata for many variables stored in memory locations in a manner similar to that for validating data types. In this illustrative embodiment, the metadata identifies the state of data for a particular memory location. This state may include the type of access that is permitted for a particular memory location. For example, the metadata may indicate that data in a particular memory location is read-only or read/write. Further, the state may indicate whether the data is initialized or uninitialized. In this manner, an interrupt is generated if the data is accessed incorrectly. This interrupt may be handled by the operating system or by some other program, such as a debugging software tool.

With reference now to FIG. 16, a flowchart of a process for determining the state of data in memory locations is depicted in accordance with a preferred embodiment of the present invention. The process illustrated in FIG. 16 may be implemented in a processor component, such as load/store unit 1400 in FIG. 14.

The process begins by receiving an instruction for execution (step 1600). Next, an operation is to be performed and the data is identified (step 1602). Then, a determination is made as to whether metadata identifying state is associated with data (step 1604). In this example, the metadata is data for identifying the state of data for a particular memory location. The state of the data may indicate, for example, that the data is initialized and read-only.

If metadata identifying the state is associated with data, then a determination is made as to whether an operation is valid for the state defined for data (step 1606). If the operation is to read the data from the memory location, then the operation is valid. If the operation involves modifying or writing new data into the memory location, the operation is invalid in this particular example. If an operation is valid for state defined for data then an operation on data is performed (step 1608) with the process terminating thereafter.

Referring back to step 1604, if metadata identifying state is not associated with data then the process proceeds to step 1608 as described above. In step 1606, if an operation is not valid for state defined for data, then an interrupt is generated (step 1610) with the process terminating thereafter. Of course, a different type of error indication, such as, for example, an exception or metadata may be generated.

Thus, the present invention provides an ability to monitor the execution of specific instructions with respect to providing hardware awareness of the data upon which operations are performed. The mechanisms of the present invention provide hardware assistance or use in generating information for increasing and verifying the reliability of software systems. These mechanisms include metadata that is used by hardware components executing instructions to determine the validity of data types for data in memory locations, determine whether operations may be legally performed on data, selectively cast data, maintain and validate assertions regarding data, and insuring that operations can be performed on data based on the state of data through the different processes described above.

Further, the steps illustrated in the flowcharts described above, with respect to hardware providing assistance in awareness of data types and operations of data, provide a logical flow of processes that may be executed by different components in hardware. In particular, these steps may be implemented as microcode or hardware logic in a processor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a processor in a data processing system for executing code using data types, the method comprising:

setting a mode in the processor to enable functions for data awareness, wherein said functions for data awareness enable the processor to perform steps of:

responsive to detecting an indication associated with a group of instructions, disabling the functions for data awareness in regards to the group of instructions;

responsive to disabling the functions for data awareness, storing data;

responsive to detecting an operation to store data in a memory location during execution of the code and responsive to an absence of an indication associated with a group of instructions, determining if a first data type is associated with the memory location, wherein the first data type is an expected data type for data to be stored in the memory location;

identifying a second data type of the data to be stored if the first data type is associated with the memory location;

responsive to identifying the second data type, comparing the first data type with the second data type for the memory location to determine whether the second data type is the expected data type for data to be stored in the memory location; and storing the data in the memory location, if the second data type is the expected data type, wherein the processor provides identification of the data types.

2. The method of claim 1 further comprising:

generating an error indication if the second data type of the data does not match the first data type of the memory location.

3. The method of claim 2, wherein the error indication includes at least one of an interrupt, an exception, or metadata.

4. The method of claim 1 further comprising:
associating metadata with the memory location, wherein the metadata defines the first data type of the memory location.

5. The method of claim 4, wherein the associating step is performed during at least one of compiling of the code and during execution of the code.

6. The method of claim 1, wherein the first data type is located in a field in the instruction.

7. The method of claim 1, wherein the first data type is located in a shadow memory.

8. The method of claim 1, wherein the first data type is located in a page table.

9. The method of claim 1, wherein setting a mode in the processor to enable functions for data awareness, comprises:
setting a register in the processor to enable functions for data awareness.

10. The method of claim 1, wherein setting a mode in the processor to enable functions for data awareness, comprises:
selectively setting the mode to an enabled state from an off state during execution of the code.

* * * * *